United States Patent
Bugenhagen

(10) Patent No.: US 10,389,577 B2
(45) Date of Patent: Aug. 20, 2019

(54) ETHERNET CARRIER GROUP ALARM (CGA)

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 14/460,085

(22) Filed: Aug. 14, 2014

(65) Prior Publication Data

US 2015/0049601 A1 Feb. 19, 2015

Related U.S. Application Data

(60) Provisional application No. 61/865,865, filed on Aug. 14, 2013.

(51) Int. Cl.
*H04L 12/24* (2006.01)
*H04L 12/26* (2006.01)

(52) U.S. Cl.
CPC .......... *H04L 41/0686* (2013.01); *H04L 43/08* (2013.01); *H04L 43/0847* (2013.01)

(58) Field of Classification Search
None
See application file for complete search history.

(56) References Cited

U.S. PATENT DOCUMENTS 7,664,115 B1 2/2010 Robotham
7,672,923 B1 3/2010 Reed
(Continued)

FOREIGN PATENT DOCUMENTS

EP 2017711 A2 1/2008
KR 10-2012-0060014 A 6/2012
(Continued)

OTHER PUBLICATIONS

International Application No. PCT/US2014/066628; Notification Concerning Availability of the Publication of the International Application dated May 28, 2015; 1 page.
(Continued)

*Primary Examiner* — Peter Chen
*Assistant Examiner* — Jeff Banthrongsack

(57) ABSTRACT

Novel tools and techniques for providing network state information to customer equipment. In some embodiments, an operations, administration, and management ("OAM") server might determine a status of a network connection between at least two network devices, might generate state information indicating the determined status of the network connection, and might send the state information to one or more customer equipment, using in-band signaling over a band between the at least two network devices. The state information might include one or more alarms that indicate one or more of a receive path error, a transmit path error, or a performance issue error (which might indicate at least one of jitter, delay, frame loss, peak actual throughput, or average actual throughput). The OAM server might be disposed or embodied within at least one of a customer equipment, a user network interface device, a network interface device, or a server over a network.

16 Claims, 9 Drawing Sheets

(56) References Cited

U.S. PATENT DOCUMENTS

| | | | |
|---|---|---|---|
| 7,693,079 | B2 | 4/2010 | Cerami et al. |
| 8,103,480 | B2 | 1/2012 | Korn et al. |
| 8,223,655 | B2 | 7/2012 | Heinz |
| 8,462,632 | B1 | 6/2013 | Vincent |
| 8,717,895 | B2 | 5/2014 | Koponen et al. |
| 8,750,288 | B2 | 6/2014 | Nakil et al. |
| 8,755,377 | B2 | 6/2014 | Nakil et al. |
| 8,953,441 | B2 | 2/2015 | Nakil et al. |
| 8,959,185 | B2 | 2/2015 | Nakil et al. |
| 9,098,214 | B1 | 8/2015 | Vincent et al. |
| 9,141,416 | B2 | 9/2015 | Bugenhagen |
| 9,158,565 | B2 | 10/2015 | Jakoljevic et al. |
| 9,231,892 | B2 | 1/2016 | Baphna et al. |
| 9,250,863 | B1 | 2/2016 | Vincent et al. |
| 9,356,883 | B1 | 5/2016 | Borthakur |
| 9,495,188 | B1 | 11/2016 | Ettema et al. |
| 9,703,598 | B2 | 7/2017 | Vincent et al. |
| 2002/0152305 | A1 | 10/2002 | Jackson et al. |
| 2004/0015966 | A1 | 1/2004 | Macchiano et al. |
| 2005/0144288 | A1 | 6/2005 | Liao |
| 2005/0228921 | A1 | 10/2005 | Sethi et al. |
| 2007/0165818 | A1 | 7/2007 | Savoor et al. |
| 2007/0230358 | A1 | 10/2007 | Narayanan et al. |
| 2008/0002676 | A1* | 1/2008 | Wiley ............... H04L 29/06027 370/356 |
| 2008/0049639 | A1 | 2/2008 | Wiley et al. |
| 2008/0049640 | A1* | 2/2008 | Heinz ................. H04L 41/0806 370/252 |
| 2008/0049927 | A1* | 2/2008 | Wiley ..................... H04L 65/80 379/230 |
| 2008/0052387 | A1 | 2/2008 | Heinz et al. |
| 2008/0155537 | A1 | 6/2008 | Dinda et al. |
| 2008/0259794 | A1 | 10/2008 | Zou et al. |
| 2009/0092151 | A1 | 4/2009 | Raguet et al. |
| 2009/0187654 | A1 | 7/2009 | Raja et al. |
| 2009/0204965 | A1 | 8/2009 | Tanaka et al. |
| 2009/0292858 | A1 | 11/2009 | Lambeth et al. |
| 2010/0023623 | A1 | 1/2010 | Saffre et al. |
| 2010/0122334 | A1 | 5/2010 | Stanzione et al. |
| 2010/0162238 | A1 | 6/2010 | Warfield |
| 2010/0192152 | A1 | 7/2010 | Miyamoto et al. |
| 2010/0306763 | A1 | 12/2010 | Lambert et al. |
| 2011/0209157 | A1 | 8/2011 | Sumida et al. |
| 2011/0222412 | A1 | 9/2011 | Kompella |
| 2011/0231551 | A1 | 9/2011 | Hassan et al. |
| 2011/0252418 | A1 | 10/2011 | Havivi et al. |
| 2011/0276951 | A1 | 11/2011 | Jain |
| 2011/0296234 | A1 | 12/2011 | Oshins et al. |
| 2011/0314469 | A1 | 12/2011 | Qian et al. |
| 2012/0072909 | A1 | 3/2012 | Malik et al. |
| 2012/0151277 | A1 | 6/2012 | Jung et al. |
| 2012/0167083 | A1 | 6/2012 | Suit |
| 2012/0174099 | A1 | 7/2012 | Ashok et al. |
| 2012/0304175 | A1 | 11/2012 | Damola et al. |
| 2012/0307684 | A1 | 12/2012 | Biswas et al. |
| 2012/0331461 | A1 | 12/2012 | Fries et al. |
| 2013/0003538 | A1 | 1/2013 | Greenberg et al. |
| 2013/0031543 | A1 | 1/2013 | Angus |
| 2013/0058215 | A1 | 3/2013 | Koponen et al. |
| 2013/0191850 | A1 | 7/2013 | Fischer et al. |
| 2013/0212600 | A1 | 8/2013 | Harsh et al. |
| 2013/0254424 | A1 | 9/2013 | Guay et al. |
| 2013/0275968 | A1 | 10/2013 | Petev et al. |
| 2013/0332926 | A1 | 12/2013 | Jakoljevic et al. |
| 2014/0012966 | A1 | 1/2014 | Baphna et al. |
| 2014/0016924 | A1 | 1/2014 | Gonzalez |
| 2014/0123140 | A1 | 5/2014 | Motoki |
| 2014/0164618 | A1 | 6/2014 | Alicherry et al. |
| 2014/0201374 | A1 | 7/2014 | Ashwood-Smith et al. |
| 2014/0282528 | A1 | 9/2014 | Bugenhagen |
| 2014/0282529 | A1 | 9/2014 | Bugenhagen |
| 2014/0321260 | A1 | 10/2014 | Mishra et al. |
| 2014/0347979 | A1 | 11/2014 | Tanaka |
| 2014/0359556 | A1 | 12/2014 | Jujare et al. |
| 2014/0372788 | A1 | 12/2014 | Vavrick et al. |
| 2015/0117454 | A1 | 4/2015 | Koponen et al. |
| 2015/0143368 | A1 | 5/2015 | Bugenhagen |
| 2015/0150020 | A1 | 5/2015 | Duttagupta et al. |
| 2015/0207699 | A1 | 7/2015 | Fargano et al. |
| 2015/0244617 | A1 | 8/2015 | Nakil et al. |
| 2015/0288541 | A1 | 10/2015 | Fargano et al. |
| 2015/0288622 | A1 | 10/2015 | Fargano et al. |
| 2015/0288767 | A1 | 10/2015 | Fargano et al. |
| 2015/0324220 | A1 | 11/2015 | Bugenhagen |
| 2015/0339156 | A1 | 11/2015 | Vincent et al. |
| 2015/0365281 | A1 | 12/2015 | Marino et al. |
| 2016/0048403 | A1 | 2/2016 | Bugenhagen |
| 2016/0087859 | A1 | 3/2016 | Kuan et al. |
| 2016/0197779 | A1 | 7/2016 | Soejima |
| 2016/0337206 | A1 | 11/2016 | Bugenhagen et al. |
| 2017/0093750 | A1 | 3/2017 | McBride et al. |
| 2017/0097834 | A1 | 4/2017 | Cropper et al. |
| 2017/0177396 | A1 | 6/2017 | Palermo et al. |
| 2018/0123974 | A1 | 5/2018 | McBride et al. |
| 2018/0150314 | A1 | 5/2018 | Bugenhagen |
| 2018/0157515 | A1 | 6/2018 | Malloy et al. |
| 2018/0157523 | A1 | 6/2018 | Bugenhagen |
| 2018/0159771 | A1 | 6/2018 | Malloy et al. |

FOREIGN PATENT DOCUMENTS

| | | |
|---|---|---|
| KR | 2013-0093717 A | 8/2013 |
| KR | 10-1472013 B1 | 12/2014 |
| KR | 20-140075925 | 12/2014 |
| KR | 20-140145645 A | 12/2014 |
| WO | WO-2014/110453 | 7/2014 |
| WO | WO 2014-150715 A1 | 9/2014 |
| WO | WO 2015/077460 | 5/2015 |
| WO | WO 2015-126430 | 8/2015 |
| WO | WO-2016/025497 | 2/2016 |
| WO | WO 2017/023396 A1 | 2/2017 |
| WO | WO 2017/058350 A1 | 4/2017 |
| WO | WO 2017/062344 A1 | 4/2017 |

OTHER PUBLICATIONS

International Search Report and Written Opinion prepared by the Korean Intellectual Property Office as International Searching Authority for PCT Intl Patent App. No. PCT/US2014/024050 dated Jun. 27, 2014; 9 pages.

International Search Report and Written Opinion prepared by the Korean Intellectual Property Office as International Searching Authority for PCT Intl Patent App. No. PCT/US2014/066628 dated Mar. 10, 2015; 10 pages.

Publication Notice of PCT Intl Patent App. No. PCT/US2014/024050 dated Sep. 25, 2014; 1 page.

U.S. Appl. No. 14/061,147; Non-Final Rejection dated Dec. 19, 2014; 29 pages.

Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.

Henrik Basilier et al. Ericsson Review. Virtualizing network services—the telecom cloud, Mar. 28, 2014, Retrieved from the Internet: <http://www.ericsson.com/res/thecompany/docs/publications/ericssor_review/2014/er-telecom-cloud.pdf> ISSN 0014-0171. pp. 1-9.

International Application No. PCT/US2014/024050; International Preliminary Report on Patentability dated Sep. 24, 2015; 6 pages.

International Application No. PCT/US2014/024050; Published Application dated Sep. 25, 2014; 55 pages.

International Application No. PCT/US2015/044682; International Search Report and Written Opinion dated Nov. 16, 2015; 13 pages.

International Application No. PCT/US2015/044690; International Search Report and Written Opinion dated Dec. 4, 2015; 12 pages.

LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.

Stuart Clayman et al. 'The Dynamic Placement of Virtual Network Functions.' In: 2014 IEEE Network Operations and Management Symposium (NOMS), May 5-9, 2014, pp. 1-9.

(56) References Cited

OTHER PUBLICATIONS

U.S. Appl. No. 14/060,450; Final Rejection dated May 21, 2015; 20 pages.
U.S. Appl. No. 14/060,450; Non-Final Rejection dated Feb. 12, 2015; 33 pages.
U.S. Appl. No. 14/061,147; Issue Notification dated Sep. 2, 2015; 1 page.
U.S. Appl. No. 14/061,147; Notice of Allowance and Interview Summary dated Apr. 29, 2015; 29 pages.
U.S. Appl. No. 14/531,000; Non-Final Rejection dated Jan. 29, 2016; 30 pages.
U.S. Appl. No. 14/583,952; Non-Final Rejection dated Mar. 28, 2016; 32 pages.
U.S. Appl. No. 14/531,000; Final Rejection dated May 2, 2016; 23 pages.
International Application No. PCT/US2014/066628; International Preliminary Report on Patentability dated Jun. 2, 2016; 7 pages.
U.S. Appl. No. 14/531,000; Non-Final Rejection dated Aug. 26, 2016; 26 pages.
U.S. Appl. No. 14/583,952; Final Rejection dated Oct. 3, 2016; 34 pages.
International Application No. PCT/US2016/044882; International Search Report and Written Opinion dated Nov. 7, 2016; 11 pages.
U.S. Appl. No. 14/583,952; Notice of Panel Decision from Pre-Appeal Brief Review dated Feb. 23, 2017; 2 pgs.
International Search Report and Written Opinion prepared by the Korean Intellectual Property Office as International Searching Authority for PCT Intl Patent App. No. PCT/US2016/055293 dated Jan. 11, 2017; 12 pages.
U.S. Appl. No. 14/531,000; Final Rejection dated Dec. 15, 2016; 24 pages.
Bohoris, Christos; "Network Performance Management Using Mobile Software Agents"; Jun. 2003; Centre for Communications Systems Research School of Electronics and Physical Sciences; University of Surrey, UK; 155 pages.
U.S. Appl. No. 14/583,952; Non-Final Rejection dated May 31, 2017; 34 pages.
U.S. Appl. No. 14/531,000; Non-Final Rejection dated Mar. 31, 2017; 32 pages.
U.S. Appl. No. 14/983,884; Notice of Allowance dated Jul. 28, 2017; 30 pages.
U.S. Appl. No. 14/531,000; Notice of Allowance dated Aug. 31, 2017; 47 pages.
U.S. Appl. No. 14/583,952; Notice of Allowance dated Oct. 4, 2017; 41 pages.
U.S. Appl. No. 14/983,884; Notice of Allowance dated Oct. 23, 2017; 10 pages.
Kang et al, "Optimizing the "One Big Switch" Abstraction in Software-Defined Networks", ACM, CoNEXT'13, Dec. 2013, pp. 13-24; <http://dl.acm.org/citation.cfm?id=2535373&CFIC=968133826&CFTOKEN=57638951>.
Vilalta et al., "Network Virtualization Controller for Abstraction and Control of Open-Flow-enabled Multi-tenant Multi-technology Transport Networks", IEEE, Jun. 2015, pp. 1-3; <http://ieeexplore.ieee.org/stamp/stamp.jsp?arnumber=7121738>.
Yu et al., "What SDN will Bring for Transport Networks?", Open Networking Summit 2014, Mar. 2014, pp. 1-2; <https://www.usenix.org/sites/default/files/ons2014-poster-yu.pdf>.
EP 14864171.5, Extended European Search Report, dated Nov. 21, 2017, 6 pgs.
European Invitation to Rule 62a(1) EPC, dated Mar. 1, 2018, 3 pages.
International Preliminary Report on Patentability dated Apr. 10, 2018, 9 pages.

\* cited by examiner

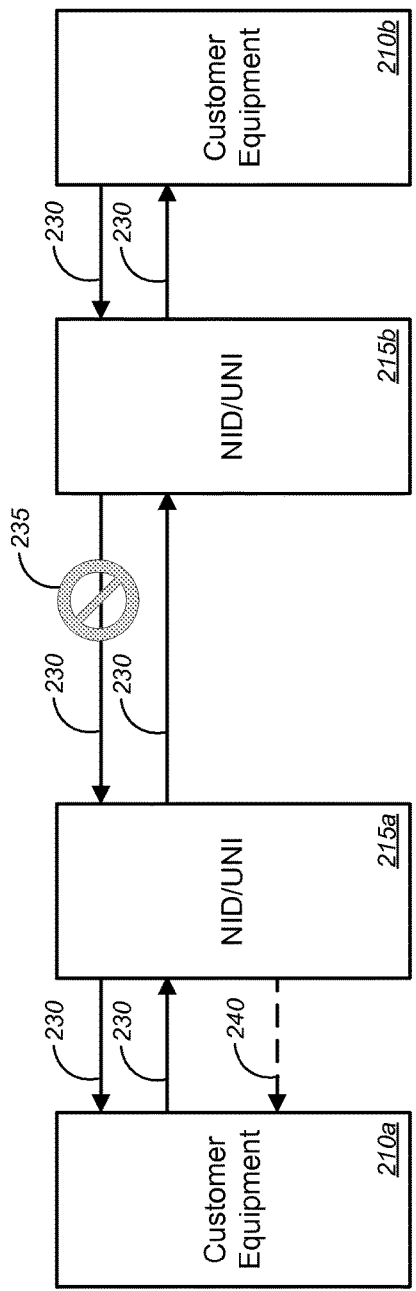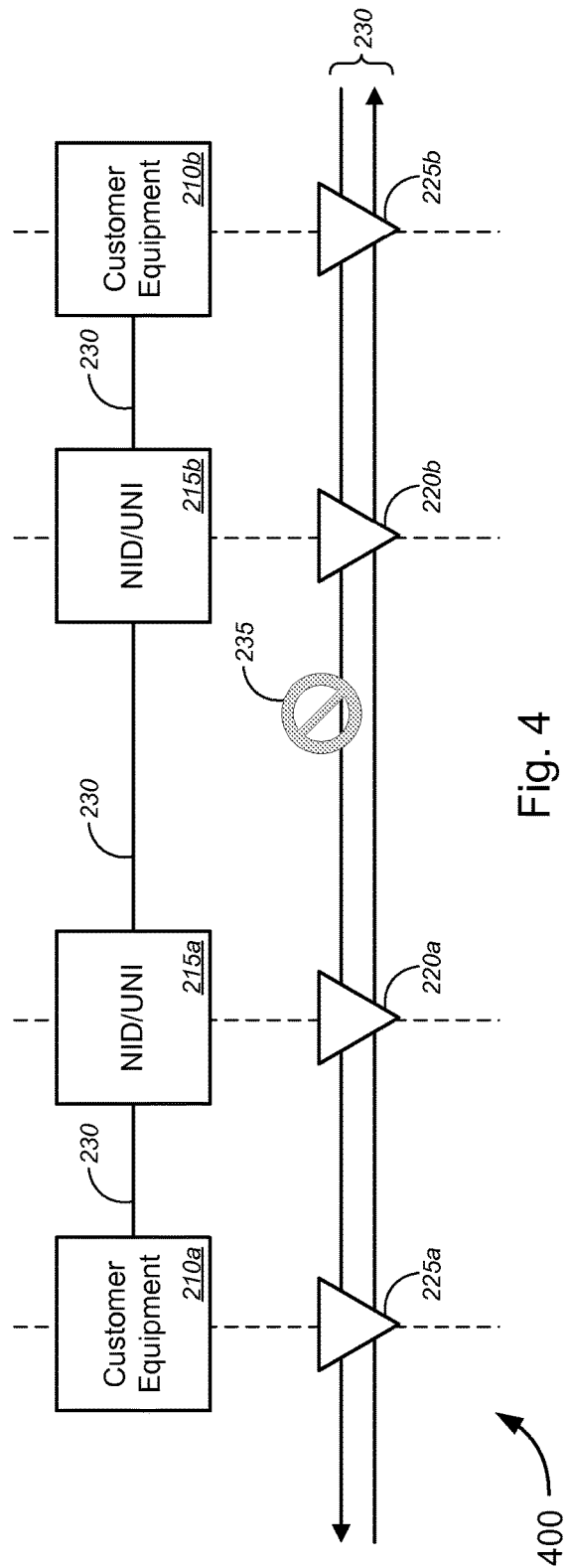

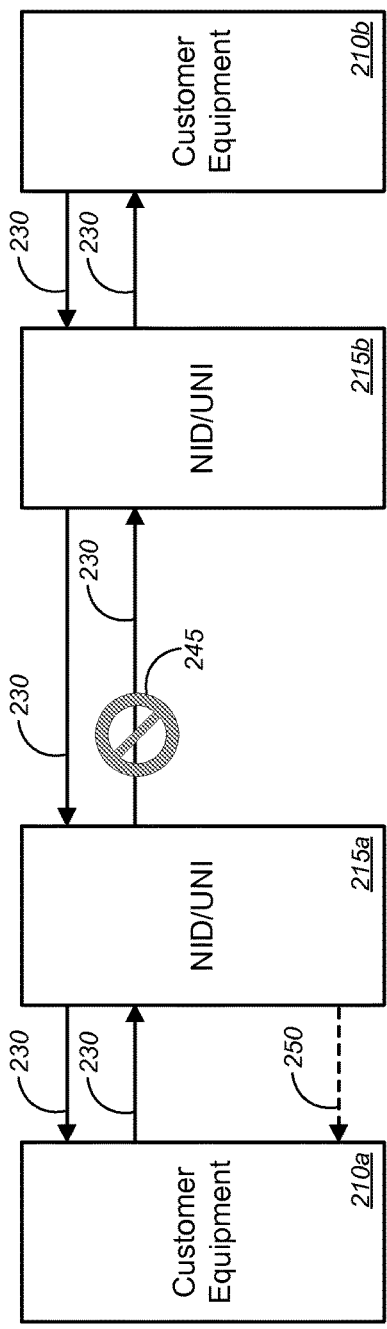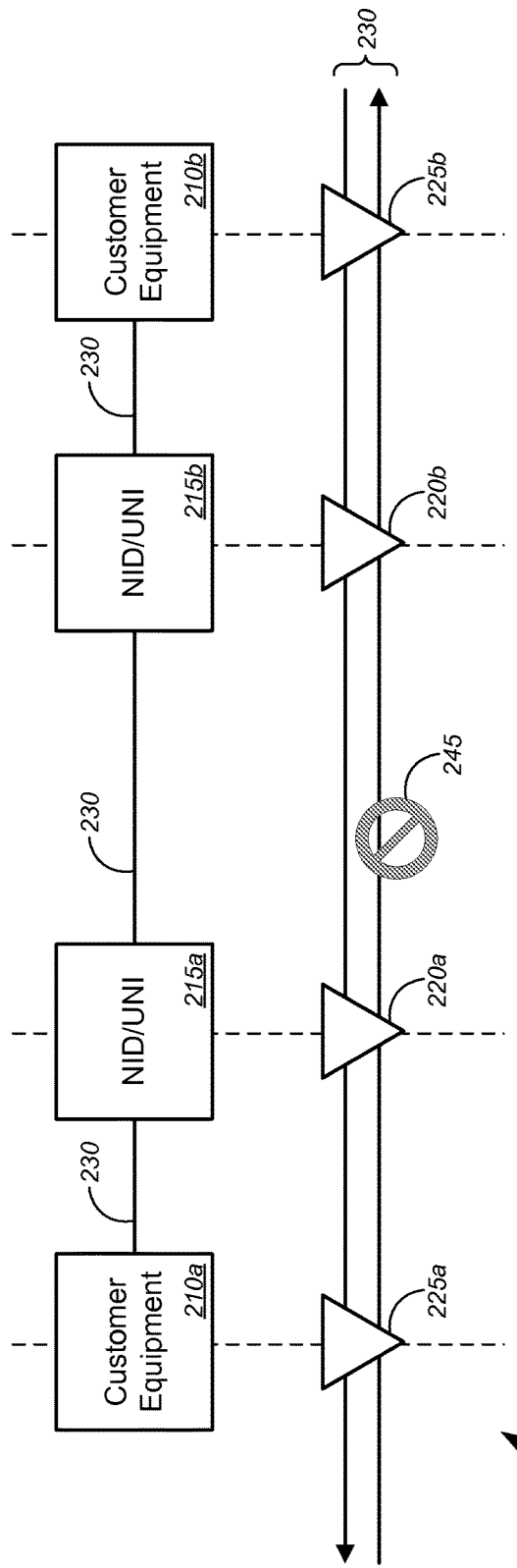

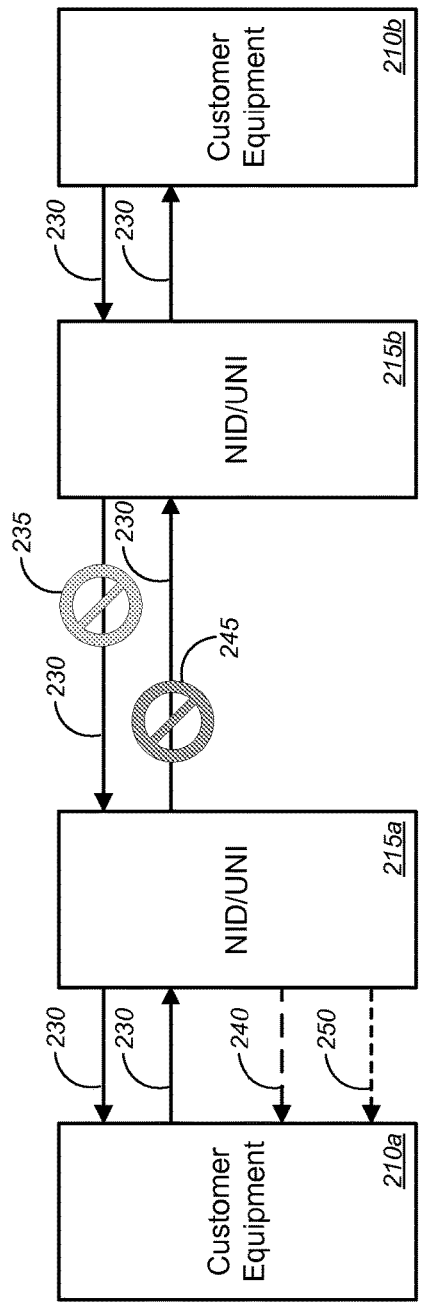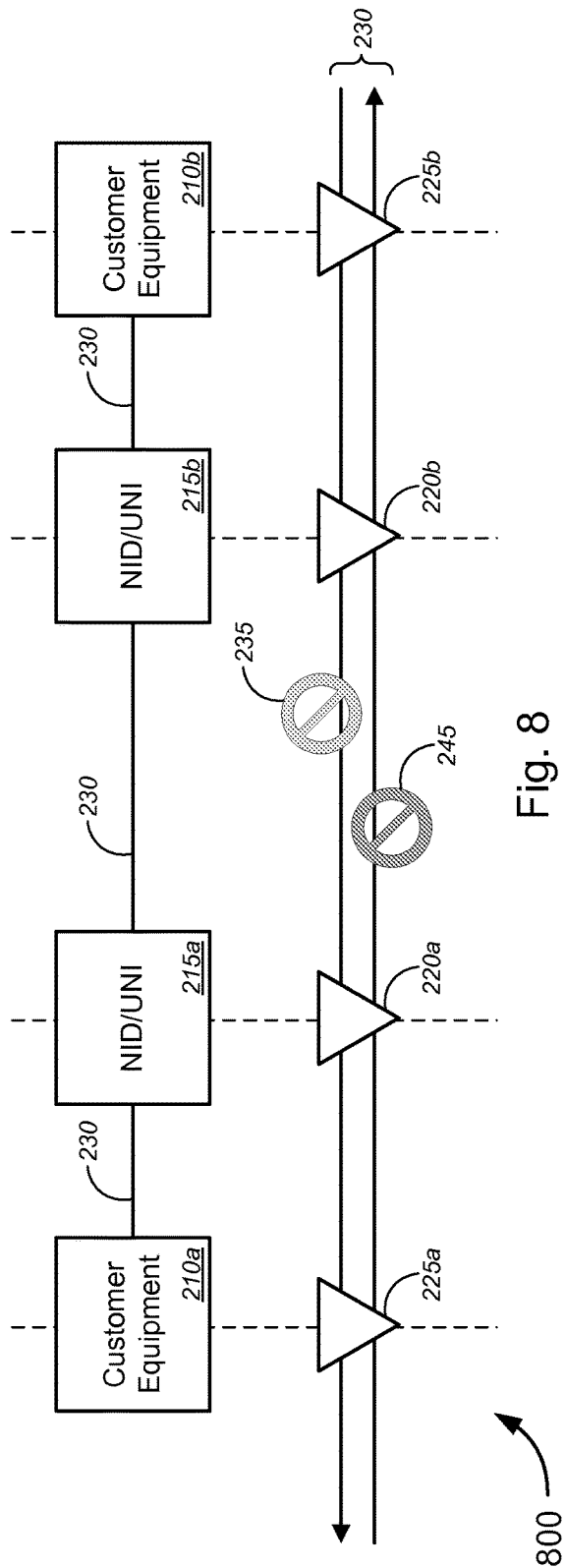
Fig. 7
Fig. 8

ETHERNET CARRIER GROUP ALARM (CGA)

CROSS-REFERENCES TO RELATED APPLICATIONS

This application claims priority to U.S. Patent Application Ser. No. 61/865,865 (the "'865 application"), filed Aug. 14, 2013 by Michael Bugenhagen, entitled, "Ethernet Carrier Group Alarm (CGA)," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network communications, and more particularly to methods, systems, and computer software for providing, by a service provider, network state information to customer equipment.

BACKGROUND

In the current Ethernet service standards, there are no defined user network interface ("UNI") to customer interface alarms. Instead, only extended local area network ("LAN") management interface standards are available that communicate as a management channel. Thus, no state information from the Service Provider operations, administration, and maintenance/management ("OA&M" or "OAM") can be relayed to the Customer in-band. In-band signaling is the sending of metadata and control information within the same band or channel used for voice or regular data transmission as opposed to out-of-band signaling, which is the exchange of call control information in a separate band from the data or voice stream, or on an entirely separate, dedicated channel.

Hence, there is a need for more robust and scalable solutions for providing network state information to customer equipment.

BRIEF SUMMARY

Various embodiments provide techniques for providing network state information to customer equipment. The disclosed embodiments seek to provide a solution to the above problem by using existing OAM features (e.g., determining performance parameters such as, but not limited to, frame loss, jitter, delay, etc.) in each direction to generate specific types of alarms, referred herein as first or Red, second or Yellow, and third or Blue alarms (other naming conventions may also be used).

In some embodiments, an operations, administration, and management ("OAM") server function might determine a status of a network connection between at least two network devices. The OAM server function might generate state information indicating the determined status of the network connection, and might send the state information to one or more customer equipment, using in-band signaling over a first band between the at least two network devices. The state information might comprise one or more alarms that indicate one or more of a receive path error, a transmit path error, or a performance issue error (which might indicate at least one of jitter, delay, frame loss, peak actual throughput, or average actual throughput). The OAM server function might be disposed or embodied within at least one of a customer equipment, a user network interface device, a network interface device, or a server over a network.

In some cases, a shaper might be used to perform at least one of adjusting signal flow or shaping signal flow of at least one of voice data or non-state information data over the first band, based at least in part on the state information. In some instances, the shaper might be disposed within at least one of the one or more customer equipment, one or more user network interface devices, one or more network interface devices, or one or more servers over a network. In some embodiments, the shaper might comprise a second OAM server function that determines status of the network connection between the at least two network devices and generates second state information indicating the determined status. In such cases, the shaper might perform the at least one of adjusting signal flow or shaping signal flow of at least one of voice data or non-state information data over the first band, based at least in part on the second state information generated by the second OAM server function within the shaper.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method might comprise determining, with an operations, administration, and management ("OAM") server, a status of a network connection between at least two network devices, and generating, with the OAM server, state information indicating the determined status of the network connection between the at least two network devices. The method might further comprise sending, with the OAM server, the state information to one or more customer equipment, using in-band signaling over a first band between the at least two network devices.

In some embodiments, the state information might comprise one or more of a first alarm, a second alarm, or a third alarm. The first alarm (referred to herein as a "Yellow alarm") might indicate, as a status of the network connection, a receive path error from the network perspective of the one or more customer equipment. The second alarm (referred to herein as a "Red alarm") might indicate, as a status of the network connection, a transmit path error from the network perspective of the one or more customer equipment. The third alarm (referred to herein as a "Blue alarm") might indicate, as a status of the network connection, a performance issue error.

In some cases, the performance issue error might indicate at least one of jitter, delay, frame loss, peak actual throughput, or average actual throughput. Merely by way of example, in some embodiments, in response to a determination that predetermined jitter tolerances are exceeded, the OAM server might generate state information comprising a first performance issue error indicating jitter. In response to a determination that predetermined delay tolerances are exceeded, the OAM server might generate state information comprising a second performance issue error indicating delay. In response to a determination that a frame loss ratio is exceeded in at least one of a transmit direction or a receive direction, the OAM server might generate state information comprising a third performance issue error indicating frame loss.

According to some embodiments, each of the at least two network devices might comprise one of a customer equipment, a user network interface device, a network interface device, or a server over a network. In some cases, the OAM server might be disposed or embodied within at least one of the one or more customer equipment, one or more user network interface devices, one or more network interface devices, or one or more servers over a network.

In some aspects, at least one of voice data or non-state information data might be communicated over the first band between the at least two network devices. The in-band signaling of the state information to the one or more customer equipment might comprise signaling of metadata and control information associated with the state information over the first band that is also used to communicate the at least one of voice data or non-state information data. In some embodiments, the method might further comprise additionally sending, with the OAM server, the state information to the one or more customer equipment, using out-of-band signaling over a second band between the at least two network devices. The second band might be a separate and dedicated band compared with the first band— in other words, the second band might communicate only state information (and not voice data or non-state information data that might be communicated over the first band).

Merely by way of example, in some embodiments, the method might further comprise performing, using a shaper, at least one of adjusting signal flow or shaping signal flow of at least one of voice data or non-state information data over the first band to ensure that communication of the at least one of voice data or non-state information data over the first band remains within predetermined threshold levels (e.g., the predetermined jitter tolerances, the predetermined delay tolerances, the frame loss ratio, and/or the like). In some cases, the shaper might perform the at least one of adjusting signal flow or shaping signal flow of at least one of voice data or non-state information data over the first band, based at least in part on the state information received from the OAM server. In some instances, the shaper might comprise a second OAM server that determines status of the network connection between the at least two network devices and generates second state information indicating the determined status. The shaper might perform the at least one of adjusting signal flow or shaping signal flow of at least one of voice data or non-state information data over the first band, based at least in part on the second state information generated by the second OAM server within the shaper. According to some cases, the shaper might be disposed within at least one of the one or more customer equipment. In some instances, the shaper might be disposed within at least one of one or more user network interface devices, one or more network interface devices, or one or more servers over a network.

In another aspect, a system might comprise an operations, administration, and management ("OAM") server, which might comprise at least one processor and a non-transitory computer readable medium in communication with the at least one processor. The computer readable medium might have stored thereon software comprising a set of instructions that when executed by the at least one processor causes the OAM server to perform one or more functions. The set of instructions might comprise instructions for determining a status of a network connection between at least two network devices, instructions for generating state information indicating the determined status of the network connection between the at least two network devices, and instructions for sending the state information to one or more customer equipment, using in-band signaling over a first band between the at least two network devices.

In some embodiments, the state information might comprise one or more of a first alarm, a second alarm, or a third alarm. The first alarm (referred to herein as a "Yellow alarm") might indicate, as a status of the network connection, a receive path error from the network perspective of the one or more customer equipment. The second alarm (referred to herein as a "Red alarm") might indicate, as a status of the network connection, a transmit path error from the network perspective of the one or more customer equipment. The third alarm (referred to herein as a "Blue alarm") might indicate, as a status of the network connection, a performance issue error.

According to some embodiments, each of the at least two network devices might comprise one of a customer equipment, a user network interface device, a network interface device, or a server over a network. In some cases, the OAM server might be disposed or embodied within at least one of the one or more customer equipment, one or more user network interface devices, one or more network interface devices, or one or more servers over a network.

In some cases, the system might further comprise a shaper configured to perform at least one of adjusting signal flow or shaping signal flow of at least one of voice data or non-state information data over the first band, based at least in part on the state information. In some instances, the shaper might be disposed within at least one of the one or more customer equipment.

In yet another aspect, an operations, administration, and management ("OAM") server might comprise at least one processor and a non-transitory computer readable medium in communication with the at least one processor. The computer readable medium might have stored thereon software comprising a set of instructions that when executed by the at least one processor causes the OAM server to perform one or more functions. The set of instructions might comprise instructions for determining a status of a network connection between at least two network devices, instructions for generating state information indicating the determined status of the network connection between the at least two network devices, and instructions for sending the state information to one or more customer equipment, using in-band signaling over a first band between the at least two network devices.

In some embodiments, the OAM server might be disposed or embodied within at least one of the one or more customer equipment, one or more user network interface devices, one or more network interface devices, or one or more servers over a network.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2-11 are block diagrams illustrating various systems for providing network state information (including alarms) to customer equipment, in accordance with various embodiments.

DETAILED DESCRIPTION OF CERTAIN EMBODIMENTS

Figure 1:
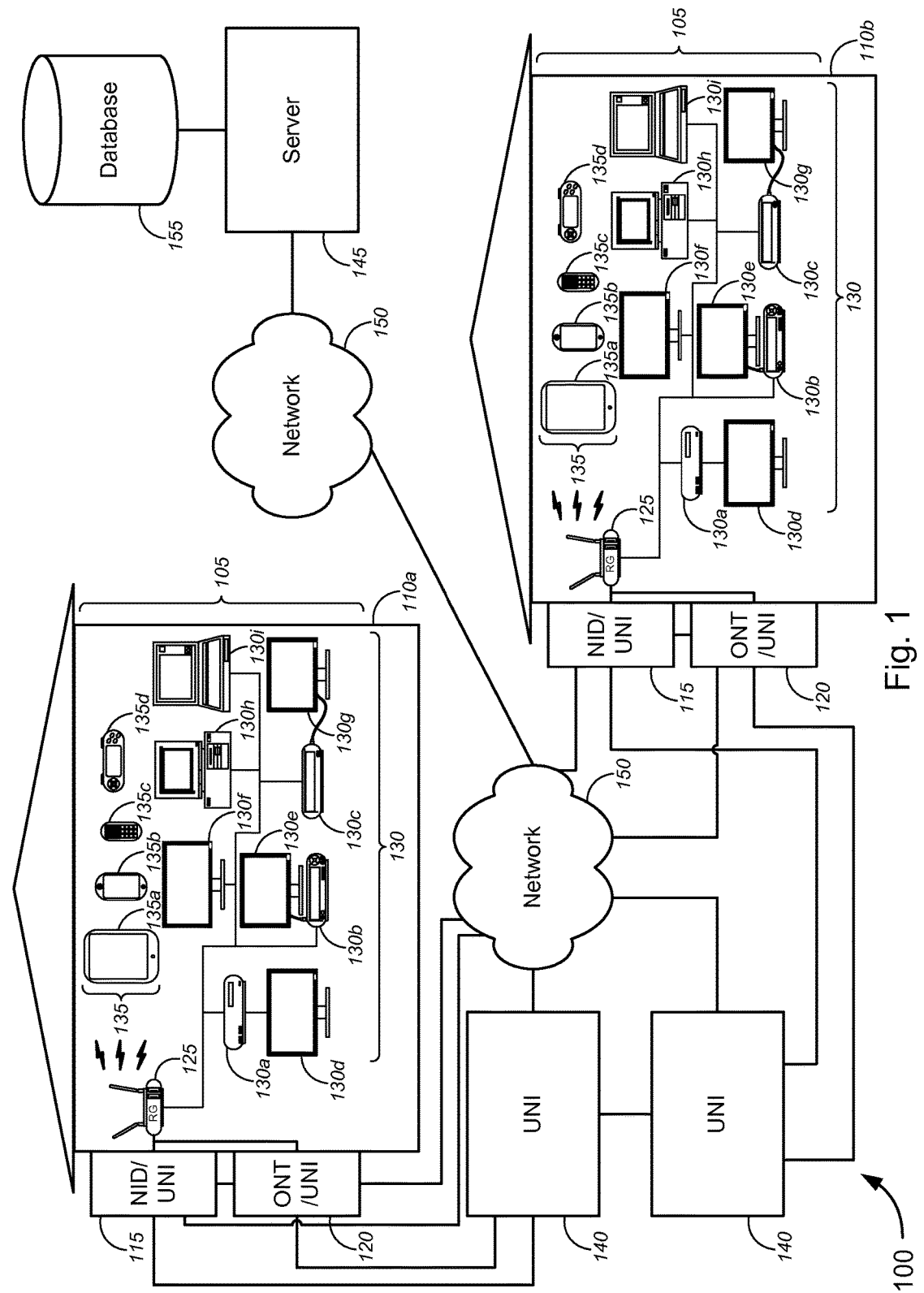
FIG. 1 is a block diagram illustrating a system for providing network state information to customer equipment, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for providing network state information to customer equipment. The disclosed embodiments seek to provide a solution to the problem of a lack of in-band signaling to provide state information (including, but not limited to, alarm notification), by using existing operations, administration, and management ("OAM") features (e.g., determining performance parameters such as, but not limited to, frame loss, jitter, delay, etc.) in each direction to generate specific types of alarms, referred herein as first or Red alarm, second or Yellow alarm, and third or Blue alarm. (Of course, other naming conventions may also be used, as appropriate or as desired.)

Herein, "operations, administration, and maintenance" or "operations, administration, and management" ("OA&M" or "OAM") might refer to processes, activities, tools, and/or standards involved with operating, administering, maintaining, and/or managing any system. In the context of Ethernet services or systems, in particular, Ethernet operations, administration, and maintenance ("EOAM") might refer to a protocol for installing, monitoring, and/or troubleshooting Ethernet metropolitan area networks ("MANs"), Ethernet wide area networks ("WANs"), and/or the like. Establishing end-to-end OAM is a key part of delivering high-performance, carrier-grade Ethernet services. Herein also, "OAM server" might refer to either a server having OAM functionality or OAM server functionality that can be embodied within any suitable piece of hardware (including, but not limited to, a customer equipment, a user network interface device, a network interface device, or a server over a network, and/or the like).

In some embodiments, an OAM server might determine a status of a network connection between at least two network devices, each of which might include, without limitation, one of a customer equipment, a user network interface device, a network interface device, or a server over a network. The OAM server might generate state information indicating the determined status of the network connection, and might send the state information to one or more customer equipment, using in-band signaling over a first band between the at least two network devices. Herein, "in-band signaling" might refer to the sending of metadata and control information within the same band or channel used for voice or regular data transmission as opposed to "out-of-band signaling," which is the exchange of call control information in a separate band from the data or voice stream, or on an entirely separate, dedicated channel. The state information might comprise one or more alarms (i.e., the first or Yellow alarm, the second or Red alarm, the third or Blue alarm, and/or the like) that indicate one or more of a receive path error, a transmit path error, or a performance issue error (which might indicate at least one of jitter, delay, frame loss, peak actual throughput, or average actual throughput). The OAM server might be disposed or embodied within at least one of a customer equipment, a user network interface device, a network interface device, or a server over a network.

Herein, "frame loss" might refer to a situation in which the frame loss ratio ("FLR") is exceeded in at least one of a transmit direction or a receive direction. For example, in one embodiment, when the FLR is exceeded in one direction, both multiplex equipment provisioning devices ("MEPs") detect the state and generate an alarm (e.g., Red alarm on the west, Yellow alarm on the East) to the customer equipment.

The FLR might be defined as a ratio, which might expressed as a percentage, of the number of service frames not delivered ("$N_{FND}$") divided by the total number of service frames ("$N_T$") during time interval T, where the number of service frames not delivered is the difference between the number service frames sent to an ingress user network interface ("UNI") ("$N_{FI}$") and the number of service frames received at an egress UNI ("$N_{FE}$"). The FLR might be represented by the following equation:

$$FLR = \frac{N_{FND}}{N_T} = \frac{N_{FND}}{N_{FE} - N_{FI}} \quad \text{(Eqn. 1)}$$

In one embodiment, the FLR detection might use sliding window stability function in both directions to trigger and/or reset the alarm. Herein also, data traffic or network traffic might have traffic patterns denoted as one of "north traffic," "east traffic," "south traffic," or "west traffic." North and south traffic might refer to data or network traffic between a client and a server, while east and west traffic might refer to data or network traffic between two servers. A MEP might refer to a maintenance functional entity that is implemented at the ends of an entity (e.g., a multiplex equipment ("ME"), or the like) that requires management. The MEP might generate and receive OAM frames.

In some cases, a shaper might be used to perform at least one of adjusting signal flow or shaping signal flow of at least one of voice data or non-state information data over the first band, based at least in part on the state information. In some instances, the shaper might be disposed within at least one of the one or more customer equipment, one or more user network interface devices, one or more network interface devices, or one or more servers over a network. In some embodiments, the shaper (also referred to herein as an "Intelligent shaper") might comprise a second OAM server that determines status of the network connection between the at least two network devices and generates second state information indicating the determined status. In such cases, the shaper or Intelligent shaper might perform the at least one of adjusting signal flow or shaping signal flow of at least one of voice data or non-state information data over the first band, based at least in part on the second state information generated by the second OAM server within the shaper.

We now turn to the embodiments as illustrated by the drawings. FIGS. 1-13 illustrate some of the features of the method, system, and apparatus for providing network state information to customer equipment, as referred to above. The methods, systems, and apparatuses illustrated by FIGS. 1-13 may refer to examples of different embodiments that include various components and steps, which can be considered alternatives or which can be used in conjunction with one another in the various embodiments. The description of the illustrated methods, systems, and apparatuses shown in FIGS. 1-13 is provided for purposes of illustration and should not be considered to limit the scope of the different embodiments.

With reference to the figures, FIG. 1 is a general schematic diagram illustrating a system 100 for providing network state information to customer equipment, in accordance with various embodiments. In FIG. 1, system 100 might comprise one or more customer premises equipment ("CPE") 105 located in or at one or more customer premises 110 (which includes, merely for the purposes of illustration in FIG. 1 and not limited to, first customer premises 110a and second customer premises 110b). At each customer premises 110, the one or more CPE 105 might comprise, without limitation, one or more of a network interface device ("NID") 115, an optical network terminal ("ONT") 120, a modem or residential gateway ("RG") 125, and/or one or more user devices 130, or the like. The one or more user devices 130 might comprise, but are not limited to, one or more of gaming console 130a, digital video recording and playback device ("DVR") 130b, set-top or set-back box ("STB") 130c, one or more television sets ("TVs") 130d-130g, desktop computer 130h, laptop computer 130i, and/or one or more mobile user devices 135, or the like. The one or more TVs 130d-130g might include, without limitation, one or more, or any combination, of a high-definition ("HD") television, an Internet Protocol television ("IPTV"), and a cable television, or the like, where one or both of HDTV and IPTV may be interactive TVs. The one or more mobile user devices 135 might comprise, but are not limited to, one or more, or any combination, of one or more tablet computers 135a, one or more smart phones 135b, one or more mobile phones 135c, and/or one or more portable gaming devices 135d, or the like. In some embodiments, "customer equipment" (as used herein) might refer to RG 125 and one or more user devices 130. In alternative embodiments, "customer equipment" (as used herein) might refer CPE 105, as defined above.

In some embodiments, one or both of the NID 115 or the ONT 120 might function as, might comprise, or might embody a user network interface ("UNI") device, which is a physical interface or port through which a service provider might deliver service to a customer or user. The UNI device serves as a demarcation point—that is, a point at which responsibility shifts from the service provider to the customer or user, and vice versa. In some cases, each of the NID 115 or the ONT 120 might provide services to the customer or user over a UNI. Typically, the UNI is located on an exterior of a structure defining the customer premises 110 (e.g., on an exterior wall of the customer premises 110) or in a dedicated room that is part of the customer premises 110 (e.g., server room or the like). In some embodiments, the UNI might not be physical attached to, disposed on, or located in the customer premises 110, but might be disposed in close proximity (e.g., located on the grounds or property lot of the customer premises 110; or located within a dedicated structure in a neighborhood of which the customer premises 110 is part). In FIG. 1, such an external UNI is shown as UNI 140.

According to some embodiments, system 100 might further comprise server 145, which, for each customer premises 110, is communicatively coupled to one or more of NID 115 (or NID/UNI 115), ONT 120 (or ONT/UNI 120), or (external) UNI 140 via one or more networks 150. In some cases, system 100 might further comprise database 155. Merely by way of example, each network 150 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In some embodiments, server or server computer 145 may be configured with an operating system, including without limitation any appropriate operating system (several of which are available from vendors such as Apple, Microsoft Corp., and the like) and/or a workstation computer running any of a variety of commercially-available UNIX™ or UNIX-like operating systems, as well as any other commercially (or freely) available server operating systems. Server or server computer 145 may also be running one or more applications, which can be configured to provide services to one or more clients (e.g., user devices 130) and/or other servers 145.

Merely by way of example, server or server computer 145 might be a data server, as described above. The data server might include (or be in communication with) a web server, which can be used, merely by way of example, to process requests for web pages or other electronic documents from user computers (e.g., user devices 130). The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers (e.g., user devices 130) to perform methods of the invention.

The server or server computer 145, in some embodiments, might include one or more application servers, which can be configured with one or more applications accessible by a client running on one or more of the client computers (e.g., user devices 130) and/or other servers 145. Merely by way of example, the server(s) 145 can be one or more general purpose computers capable of executing programs or scripts in response to the user computers (e.g., user devices 130) and/or other servers 145, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device (e.g., user devices 130) and/or another server 145. In some embodiments, an application server can perform one or more of the processes for providing network state information to customer equipment, or the like, as described in detail above. Data provided by an application server may be formatted as one or more web pages (comprising HTML, JavaScript, etc., for example) and/or may be forwarded to a user computer (e.g., user device 130) via a web server (as described above, for example). Similarly, a web server might receive web page requests and/or input data from a user computer (e.g., user device 130) and/or forward the web page requests and/or input data to an application server. In some cases a web server may be integrated with an application server.

In accordance with further embodiments, server or server computer 145 can function as a file server and/or can include one or more of the files (e.g., application code, data files, etc.) necessary to implement various disclosed methods, incorporated by an application running on a user computer (e.g., user device 130) and/or another server 145. Alternatively, as those skilled in the art will appreciate, a file server can include all necessary files, allowing such an application to be invoked remotely by a user computer or user device (e.g., user device 130) and/or a server 145.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the location of the database(s) 155 is discretionary: merely by way of example, a database might reside on a storage medium local to (and/or resident in) a server (and/or a user computer or user device 130). Alternatively, a database can be remote from any or all of the computers (e.g., user device 130 and/or server 145), so long as it can be in communication (e.g., via the network(s) 150) with one or more of these. In a particular set of embodiments, a database 155 can reside in a storage-area network ("SAN") familiar to those skilled in the art. (Likewise, any necessary files for performing the functions attributed to the computers (e.g., user device 130 and/or server 145) can be stored locally on the respective computer and/or remotely, as appropriate.) In one set of embodiments, the database 155 can be a relational database, such as an Oracle database, that is adapted to store, update, and retrieve data in response to SQL-formatted commands. The database might be controlled and/or maintained by a database server, as described above, for example.

According to some aspects, system 100 might further comprise an OAM server, which might be disposed or embodied within at least one of a server 145, a (external) UNI 140, a NID 115, a NID/UNI 115, an ONT 120, an ONT/UNI 120, a RG 125, and/or one or more user devices 130, or the like. In some embodiments, the OAM server might determine a status of a network connection between at least two network devices (say, for instance, server 145 and NID/UNI 115 of customer premises 110*b*).

The OAM server might generate state information indicating the determined status of the network connection between the at least two network devices. In some cases, the state information might include, without limitation, a first alarm (referred to herein as a Yellow alarm), a second alarm (referred to herein as a Red alarm), or a third alarm (referred to herein as a Blue alarm). The first or Yellow alarm might indicate (as a status of the network connection) a receive path error from the network perspective of the customer equipment (i.e., RG 125 and/or at least one of user device 130, or the like). A receive path error might include an error associated with a failure to communicate voice data and/or non-state information data along the receiving path (i.e., path toward the customer equipment (e.g., RG 125 and/or one or more user devices 130)). The second or Red alarm might indicate (as a status of the network connection) a transmit path error from the network perspective of the customer equipment. A transmit path error (similar to the receive path error) might include an error associated with a failure to communicate voice data and/or non-state information data, except that the failure is along the transmitting path (i.e., path from or away from the customer equipment (e.g., RG 125 and/or one or more user devices 130)). In some cases, failure to communicate voice data and/or non-state information data (either along the receive path, along the transmit path, or both) might include a full failure (in which no data can be communicated) or a partial failure (in which some data is communicated but not all, such as with frame loss or data packet loss, or the like).

In some instances, the third or Blue alarm might include (as a status of the network connection) a performance issue error, which might indicate at least one of jitter, delay, frame loss, peak actual throughput, and/or average actual throughput, or the like. In some cases, the OAM server might generate state information comprising a first performance issue error indicating jitter, in response to a determination that predetermined jitter tolerances are exceeded. In some instances, the OAM server might generate state information comprising a second performance issue error indicating delay, in response to a determination that predetermined delay tolerances are exceeded. In some embodiments, the OAM server might generate state information comprising a third performance issue error indicating frame loss, in response to a determination that a frame loss ratio is exceeded in at least one of a transmit direction or a receive direction. According to some embodiments, the OAM server might generate state information comprising a fourth performance issue error indicating one or both of peak actual throughput and/or average actual throughput (in some cases, together with expected or subscribed throughput, for comparison).

In some embodiments, the OAM server might send the state information (including, without limitation, one or more of the first/Yellow alarm, the second/Red alarm, the third/Blue alarm, and/or the like) to one or more customer equipment (e.g., RG 125 and/or one or more user devices 130), using in-band signaling over a first band or channel between the at least two network devices (e.g., server 145 and NID/UNI 115 of customer premises 110b, as in the example above). In some cases, in-band signaling of the state information to the one or more customer equipment might comprise signaling of metadata and control information associated with the state information over the first band that is also used to communicate the at least one of voice data or non-state information data, as opposed to out-of-band signaling, in which case, the state information is sent over a second band or channel that is separate from the first band. The second band is also a dedicated band that communicates only state information (and not voice data and/or non-state information data).

Merely by way of example, in some embodiments, the OAM server might additionally send the state information to the one or more customer equipment (e.g., RG 125 and/or one or more user devices 130), using out-of-band signaling over the second (i.e., separate and dedicated) band or channel between the at least two network devices. In such a case, the state information might be duplicated to ensure delivery of the state information (i.e., one or more of the first/Yellow alarm, the second/Red alarm, the third/Blue alarm, and/or the like) to the one or more customer equipment (e.g., RG 125 and/or one or more user devices 130) over one or both the first (in-band) channel or the second (out-of-band) channel.

According to some embodiments, as described in detail below with respect to FIG. 11, system 100 might further comprise a shaper, which is configured to adjust signal flow or shape signal flow of at least one of voice data or non-state information data over the first band to ensure that communication of the at least one of voice data or non-state information data over the first band remains within predetermined threshold levels (i.e., threshold levels including, but not limited to, jitter tolerances, delay tolerances, frame loss ratio, and/or the like). In some cases, the shaper might be embodied or disposed within only one or more of the customer equipment (e.g., RG 125 and/or one or more user devices 130, or the like). In alternative cases, the shaper might be embodied or disposed within at least one of a NID 115, a NID/UNI 115, an ONT 120, an ONT/UNI 120, a RG 125, one or more user devices 130, a (external) UNI 140, and/or a server 145, or the like.

In some embodiments, the shaper might include or have disposed therein a separate OAM server that also determines status of the network connection between the at least two network devices and generates second state information indicating the determined status. In some cases, the shaper might adjust signal flow or shape signal flow of at least one of voice data or non-state information data over the first band (or in-band channel), based on the state information generated by the OAM server, based on the second state information generated by the shaper, or based on both the state information generated by the OAM server and the second state information generated by the shaper.

FIGS. 2-11 are block diagrams illustrating various systems 200-1100 for providing network state information (including alarms) to customer equipment, in accordance with various embodiments. Although systems 200-1100 of FIGS. 2-11, respectively, may comprise some or all of the components of system 100 of FIG. 1, for simplicity of illustration, only two customer equipment and two NID/UNI (which are components of system 100) are shown. In FIGS. 2-11, like numerals refer to similar components, structures, or elements. The non-limiting embodiments as shown in FIGS. 2-11 depict in-band signaling of state information (which includes the first/Yellow alarm, the second/Red alarm, and/or the third/Blue alarm). Although specific configurations and implementations are shown in FIGS. 2-11, the various embodiments are not so limited, and any suitable configurations and implementations may be used, as appropriate and/or as desired.

Typically, at least in some embodiments, a "maintenance entity" or OAM server function might be located at the UNI to perform OAM functions including performance tracking and status of the end to end service flow. Hereinafter, any reference to UNI might refer to the OAM server entity at the UNI itself. All communication and/or signaling from this server entity to customer equipment is assumed to use any one of multiple protocols and/or signaling components, including, without limitation, the ability for the customer to query the state of the service, e.g., by polling the OAM server function. Further, in FIGS. 2-11, triangular blocks 220 and 225 denote location of an OAM server within the corresponding component linked by dash lines; for example, OAM server 220 might be embodied or otherwise disposed in NID/UNI 215, while OAM server 225 might be embodied or otherwise disposed in customer equipment 210. In FIGS. 2-11, customer equipment 210 might correspond to at least one of RG 125 and/or one or more user devices 130 as shown in and described above with respect to FIG. 1, while NID/UNI 215 might correspond to at least one of a NID 115, a NID/UNI 115, an ONT 120, an ONT/UNI 120, and/or a (external) UNI 140, or the like. Although not shown, a network (e.g., network 150 of FIG. 1) might communicatively couple two or more NID/UNIs 115.

Figure 2:
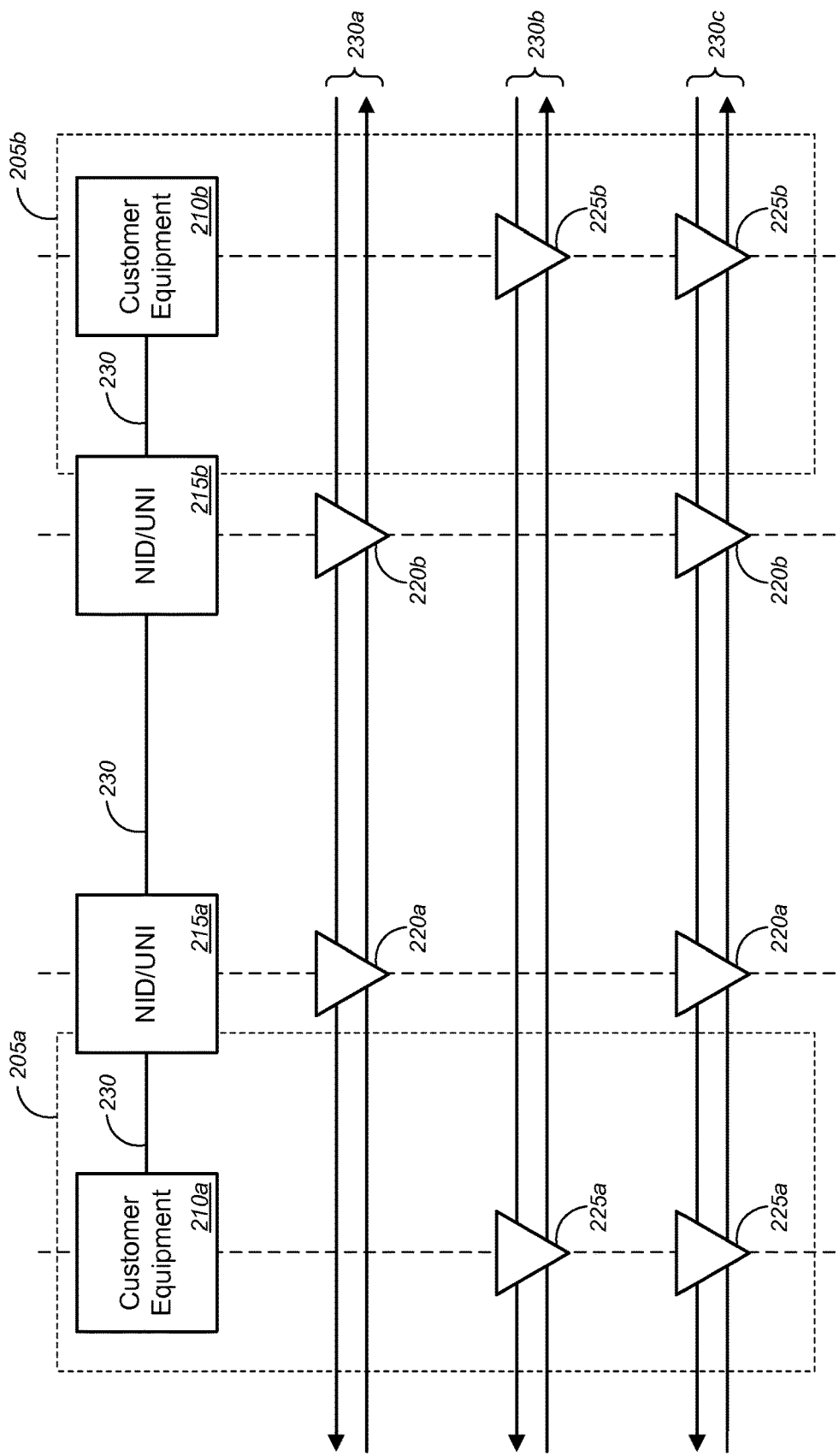

Referring to FIG. 2, system 200 might comprise first customer premises 205a and second customer premises 205b (collectively, customer premises 205, which might, in some cases, correspond to customer premises 110 in FIG. 1). In the embodiment of FIG. 2, system 200 might further comprise a first customer equipment 210a located within the first customer premises and a second customer equipment 210b located within the second customer premises 210b (which is different, and geographically separate, from the first customer premises 210a). The first customer equipment 210a might communicate with the second customer equipment 210b via NID/UNI 215a and NID/UNI 215b (collectively, "NID/UNI 215"), in some cases, over band or channel 230. According to some embodiments, band 230 might be an in-band channel that communicates (in both the East and West directions between servers) voice data and/or non-status information data, while also communicating state information (such as described in detail above with respect to FIG. 1).

FIG. 2 also shows various configurations in terms of location of the OAM server(s). For example, with reference to the example with in-band channel 230a, the OAM server might be disposed or embodied in each of the NID/UNI 215 units. In another example, with reference to the example with in-band channel 230b, the OAM server might be disposed or embodied in each of the customer equipment 210. In yet another example, with reference to the example with in-band channel 230c, the OAM server might be disposed or embodied in each of the first customer equipment 210a, the second customer equipment 210b, the NID/UNI 215a, and the NID/UNI 215b. In some embodiments, not shown, the OAM server 220 or 225 might be disposed or embodied in one of the first or second customer equipment 210a/210b (but not both), and/or one of the NID/UNI 215a/215b (but not both).

FIGS. 3-10 illustrate first, second, and/or third errors and the communication of first, second, and/or third alarms (i.e., Yellow, Red, and/or Blue alarms), respectively. In some embodiments, the circuit comprising the in-band channel 230 might comprise, without limitation, a TDM (T1/D3) circuit, or the like. For instance, in one embodiment, using a TDM (T1/D3) circuit, a UNI can be configured to detect carrier group alarms or failed carrier states, and might pass those states to the customer in terms of a signal so that the customer network knows that the system has a problem and can react to the loss of the carrier circuit.

With specific reference to the embodiment of FIGS. 3 and 4, systems 300 and 400 show a UNI 215a or OAM server 220 detecting a first or Yellow error 235 indicating a receive path error. The UNI 215a or OAM server 220 might be configured to declare a first or Yellow alarm 240 when it determines that there is a receive path error 235, and might send the first or Yellow alarm 240 downstream to the customer equipment 210a. In some cases, the UNI 215a or OAM server 220 might be configured to declare a first or Yellow alarm 240 when it determines that there is a receive path error 235 that exceeds a first predetermined time threshold (which might include, but is not limited to, 1 s, 2 s, 2.5 s, 3 s, 5 s, 10 s, etc., or a range between is and 15 s).

Turning to the embodiment of FIGS. 5 and 6, systems 500 and 600 show a UNI 215a or OAM server 220 detecting a second or Red error 245 indicating a transmit path error. The UNI 215a or OAM server 220 might be configured to declare a second or Red alarm 250 when it determines that there is a transmit path error 245, and might send the second or Red alarm 250 back to the customer equipment 210a. In some cases, the UNI 215a or OAM server 220 might be configured to declare a second or Red alarm 240 when it determines that there is a transmit path error 245 that exceeds a second predetermined time threshold (which might include, but is not limited to, 1 s, 2 s, 2.5 s, 3 s, 5 s, 10 s, etc., or a range between 1 s and 15 s).

Referring to the embodiment of FIGS. 7 and 8, systems 700 and 800 show a UNI 215a or OAM server 220 detecting both a first or Yellow error 235 indicating a receive path error and a second or Red error 245 indicating a transmit path error. The UNI 215a or OAM server 220 might be configured to declare a first or Yellow alarm 240 when it determines that there is a receive path error 235 and declare a second or Red alarm 250 when it determines that there is a transmit path error 245. The UNI 215a or OAM server 220 might be configured to send the first or Yellow alarm 240 downstream to the customer equipment 210a, and to send the second or Red alarm 250 (also) back to the customer equipment 210a. In some cases, the UNI 215a or OAM server 220 might be configured to declare a first or Yellow alarm 240 when it determines that there is a receive path error 235 that exceeds the first predetermined time threshold and to declare a second or Red alarm 240 when it determines that there is a transmit path error 245 that exceeds the second predetermined time threshold. In some cases, the first and second predetermined time thresholds might be the same, while in other cases, the first and second predetermined time thresholds might be different.

FIGS. 4, 6, and 8 further illustrate the process for adding a Yellow state, a Red state, or both states, respectively, and signaling capabilities in accordance with the disclosed embodiments. In one embodiment, when the FLR (which is described in detail above and defined, e.g., in Eqn. 1) is exceeded in one direction, both MEPs detect the state and generate an alarm (Red on the West, and Yellow on the East) to the customer. In one embodiment, when the FLR is exceeded in one direction, the disclosed system might light on the NID to indicate the alarm, and might push signaling in-band to the customer equipment. In some embodiments, the disclosed system may be configured with the ability for the customer to query the NID or UNI for its state (via use of the customer equipment).

Figure 9:
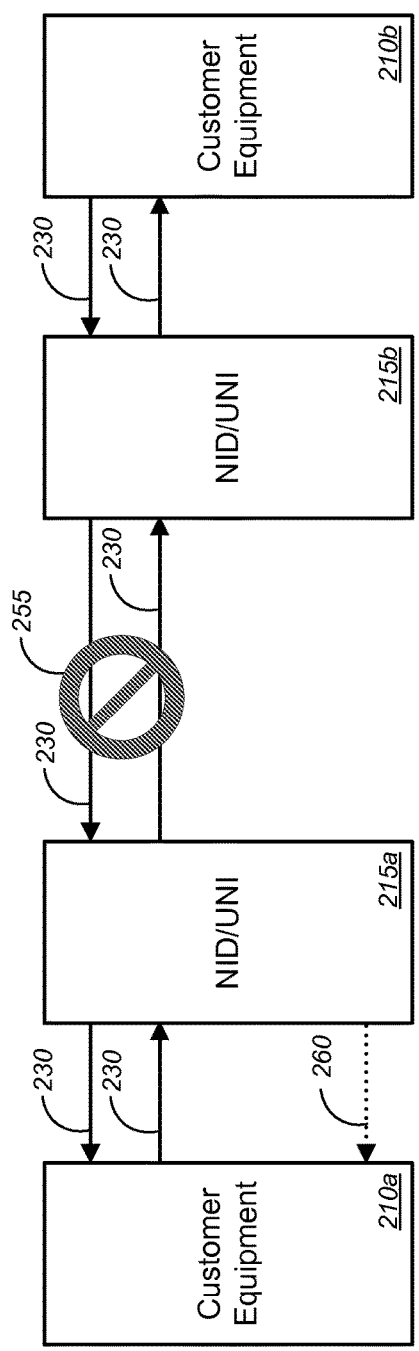
Figure 10:
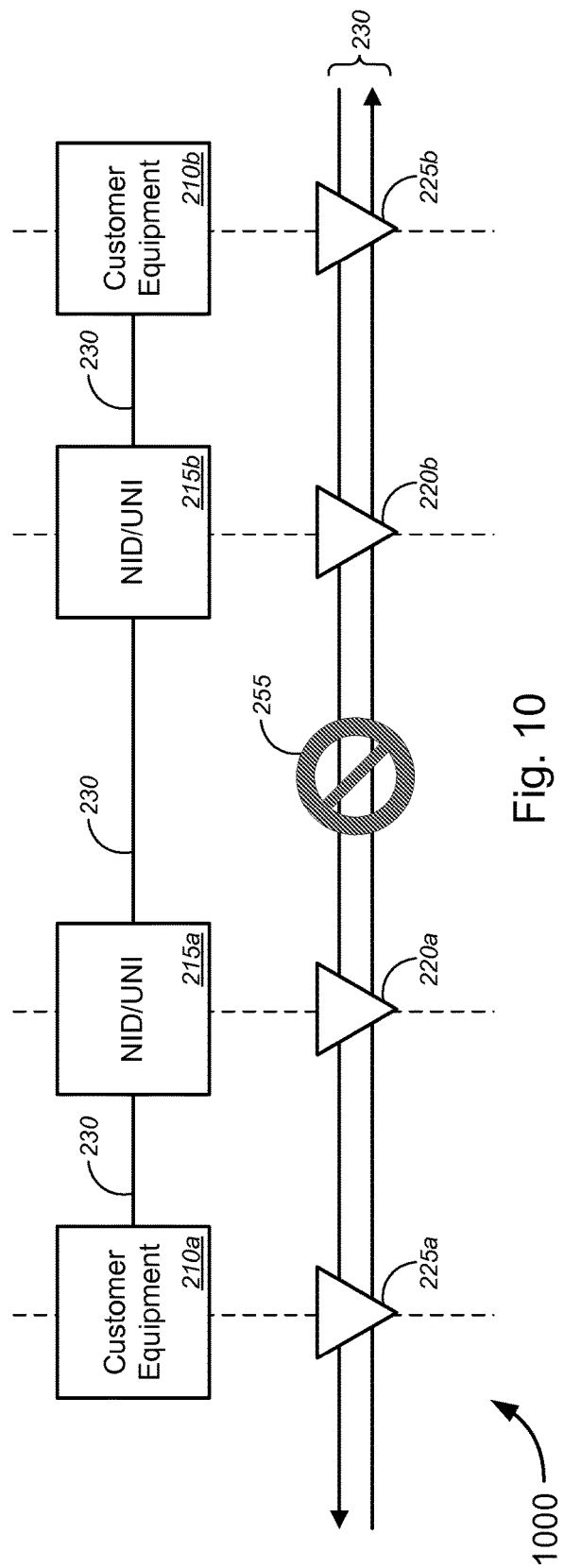

FIGS. 9 and 10 illustrate network diagrams for implementing a third or Blue alarm, in accordance with one embodiment. For instance, in one embodiment, similar to the Yellow and Red alarms, using a TDM (T1/D3) circuit, a UNI or an OAM server can be configured to detect carrier group alarms or failed carrier states, and to pass those states to the customer at the customer equipment in terms of a signal so the customer equipment (or customer network) knows that the system has a problem and can react to the loss of the carrier circuit.

Turning to the embodiment of FIGS. 9 and 10, systems 900 and 1000 show a UNI 215a or OAM server 220 detecting a third or Blue error 255 indicating a performance issue error. The UNI 215a or OAM server 220 might be configured to declare a third or Blue alarm 260 when it determines that the service is operating out of specification (e.g., due to jitter, delay, frame loss, sub-optimal throughput, and/or the like). In one embodiment, the third or Blue alarm 260 is used for providing indication to the customer (associated with the customer equipment) of jitter and/or delay performance problems. For instance, in one embodiment, when jitter and/or delay tolerances are exceeded, the disclosed system lights on the NID to indicate the alarm and pushes signaling in-band to the customer at the customer equipment. Similarly, in certain embodiments, the disclosed system may be configured with the ability for the customer (using the customer equipment) to query the NID for its state.

In some embodiments, a "good throughput" Blue alarm may also be used. For instance, in one embodiment, when the circuit is up, but is not delivering committed throughput, the disclosed system may track the actual delivered throughput both short term and long term, and may report them as peak and average actual throughput.

Figure 11:
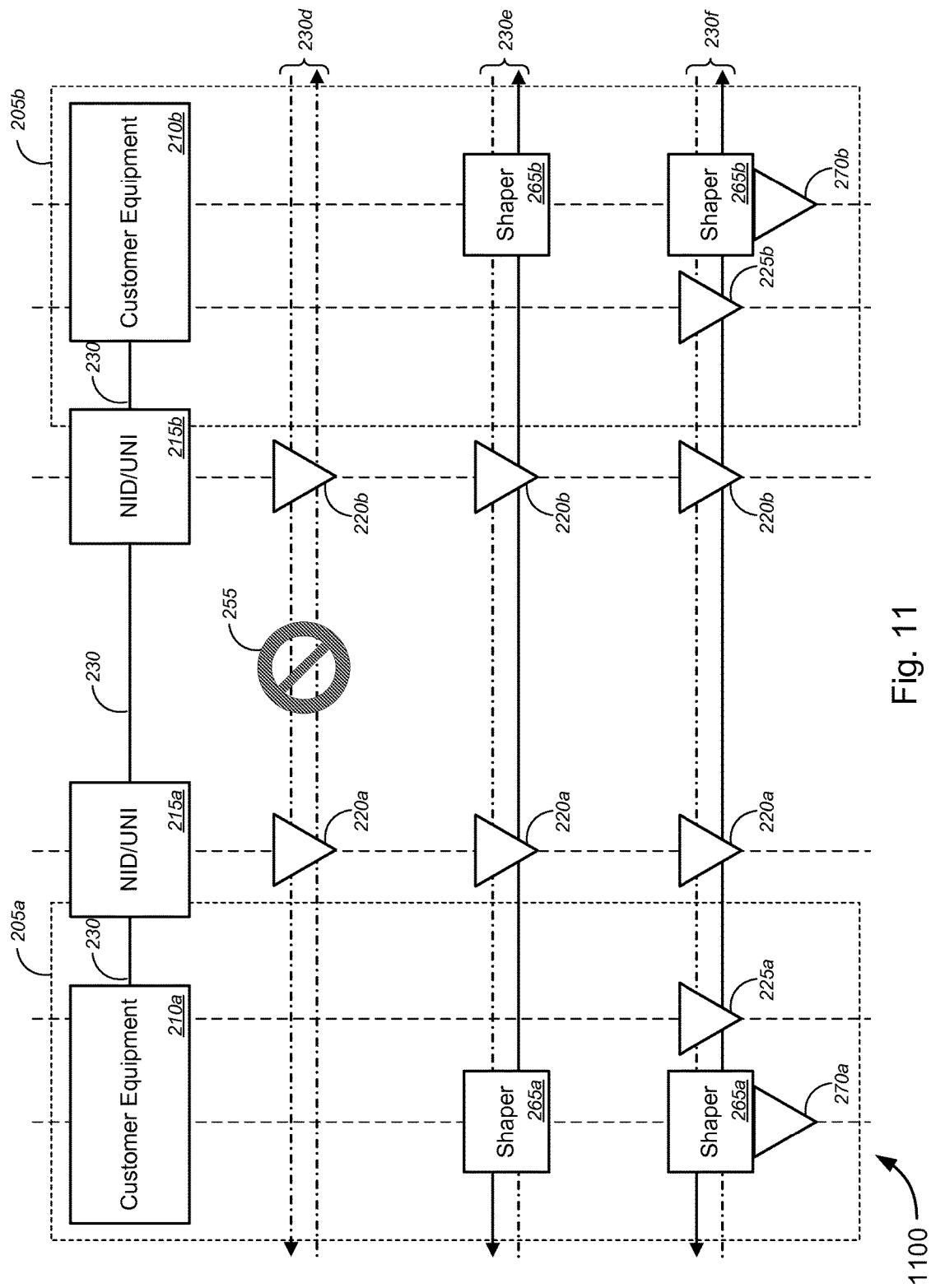

In some embodiments, the disclosed embodiments may be further enhanced by adding or using an Intelligent Shaper on the customer equipment, as illustrated in FIG. 11. For instance, in one embodiment, if the UNI (e.g., UNI 215*a*) detects a carrier group alarm or failed carrier state caused by frame loss due to the system not being able to handle a high throughput rate, the UNI can be configured to issue a third or Blue alarm 260 and provide the customer equipment (e.g., customer equipment 210*a*) with the long term average throughput number. The customer equipment can then use a shaper inside the customer equipment to adjust or shape the flow to the appropriate level to ensure that it doesn't exceed threshold crossings and encounter frame loss. For instance, in one embodiment, the shaper is configured to adjust to lower throughput conditions to ensure frame loss doesn't plague the user when the user tries to use an impaired service.

In another embodiment, the disclosed embodiments may employ a self-maintaining intelligent shaper. For instance, in the case where a carrier may not have any signaling to indicate "good throughput," the disclosed embodiments may deploy two OAM sessions, one inside the shaper and one outside the shaper. In this embodiment, the post-shaped OAM session would track "good throughput" (shown, e.g., as the solid arrows along portions of the in-band channel 230 in FIG. 11) and change the shaper itself as opposed to depending upon the carrier to detect and signal the shaper.

With reference to the example with in-band channel 230*d* in the embodiments of FIG. 11, an impaired service is depicted by dot-dash arrows indicating possible frame losses (or other performance issues) in the in-band channel 230*d*. With reference to the examples with in-band channel 230*e* in FIG. 11, shaper 265*a* is shown having adjusted or shaped the flow of the data (i.e., voice data and/or non-state information data), based on third or Blue alarm 260 (indicating error 255) as declared and sent by UNI 215*a* or OAM server 220*a*. The adjusted or shaped flow is depicted by the solid arrow portions along in-band channel 230*e*. With reference to the examples with in-band channel 230*f* in FIG. 11, shaper 265*a* is shown having adjusted or shaped the flow of the data (i.e., voice data and/or non-state information data), based on third or Blue alarm 260 (indicating error 255) as declared by integrated OAM server 270*a*. The adjusted or shaped flow is depicted by the solid arrow portions along in-band channel 230*f*. In some cases, shaper 265*a* might adjust or shape the flow of the data (i.e., voice data and/or non-state information data), based at least in part on third or Blue alarm 260 (indicating error 255) as declared by integrated OAM server 270*a* and based at least in part on third or Blue alarm 260 (indicating error 255) as declared and sent by UNI 215*a* or OAM server 220*a*.

Although the embodiments of FIG. 11 are described as having the shaper 265 embodied or disposed only within the customer equipment, the various embodiments are not so limited, and the shaper may be disposed within at least one of the one or more customer equipment, one or more user network interface devices, one or more network interface devices, and/or one or more servers over a network.

Figure 12:
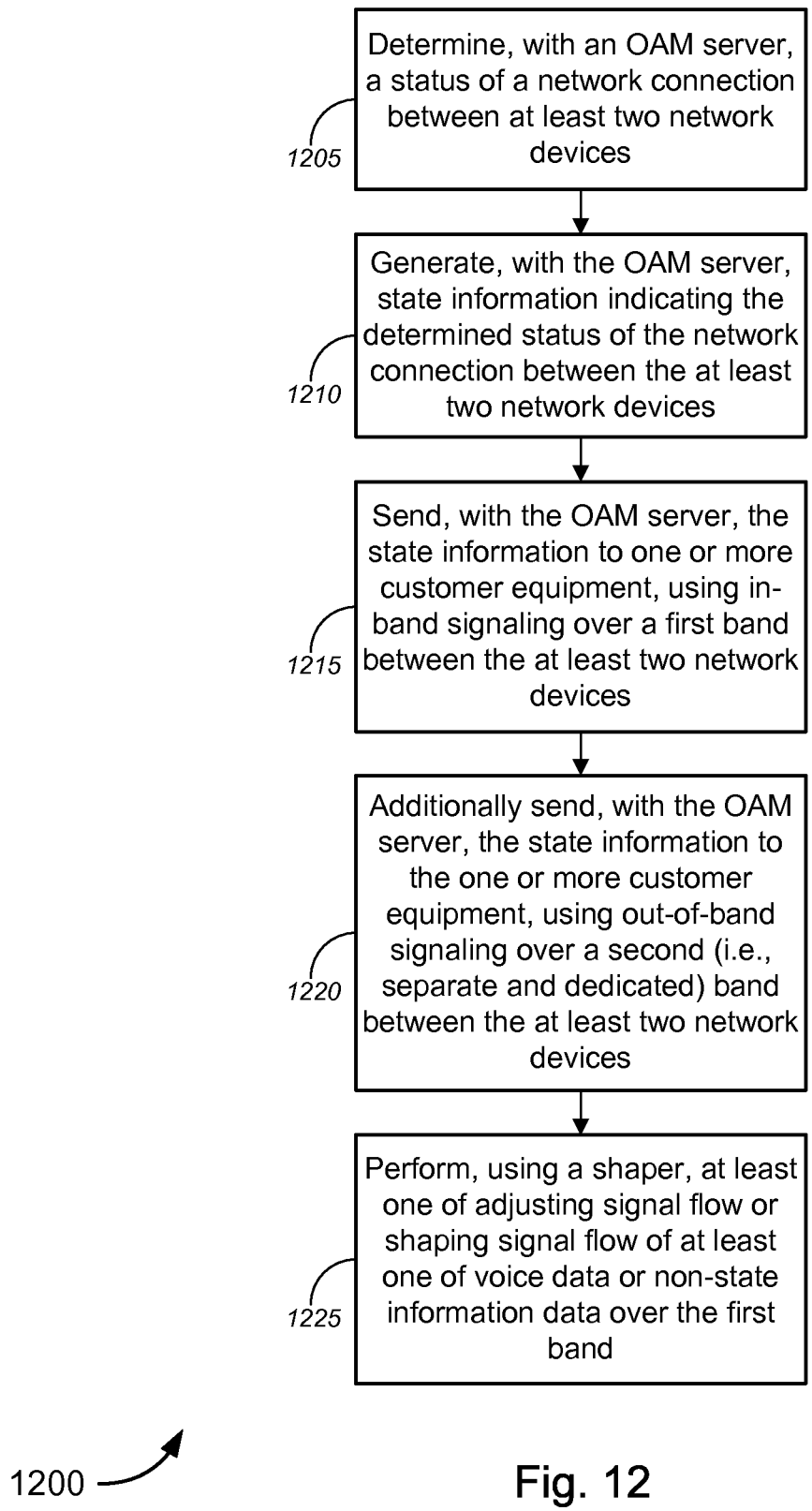
FIG. 12 is a flow diagram illustrating a method for providing network state information to customer equipment, in accordance with various embodiments.

We now turn to FIG. 12, which is directed to method 1200 for providing network state information to customer equipment, in accordance with various embodiments. While the techniques and procedures of the method 1200 is depicted and/or described in a certain order for purposes of illustration, it should be appreciated that certain procedures may be reordered and/or omitted within the scope of various embodiments. Moreover, while the method illustrated by FIG. 12 can be implemented by (and, in some cases, are described below with respect to) system 100 of FIG. 1 (or components thereof), or any of systems 200-1100 of FIGS. 2-11 (or components thereof), respectively, the method may also be implemented using any suitable hardware implementation. Similarly, while systems 100-1100 (and/or components thereof) can operate according to the methods illustrated by FIG. 12 (e.g., by executing instructions embodied on a computer readable medium), systems 100-1100 can also operate according to other modes of operation and/or perform other suitable procedures.

In FIG. 12, method 1200 might comprise determining, with an operations, administration, and management ("OAM") server, a status of a network connection between at least two network devices (block 1205). In some cases, the OAM server might be disposed or embodied within at least one of the one or more customer equipment, one or more user network interface devices, one or more network interface devices, and/or one or more servers over a network. A network device of the at least two network devices might comprise one of a customer equipment, a user network interface device, a network interface device, and/or a server over a network.

At block 1210, method 1200 might comprise generating, with the OAM server, state information indicating the determined status of the network connection between the at least two network devices. In some embodiments, the state information might comprise one or more of a first alarm, a second alarm, and/or a third alarm, or the like. The first alarm (or "Yellow alarm") might indicate, as a status of the network connection, a receive path error from the network perspective of the one or more customer equipment. The second alarm (or "Red alarm") might indicate, as a status of the network connection, a transmit path error from the network perspective of the one or more customer equipment. The third alarm (or "Blue alarm") might indicate, as a status of the network connection, a performance issue error.

In some cases, the performance issue error might indicate at least one of jitter, delay, frame loss, peak actual throughput, or average actual throughput. Merely by way of example, in some embodiments, in response to a determination that predetermined jitter tolerances are exceeded, the OAM server might generate state information comprising a first performance issue error indicating jitter. In response to a determination that predetermined delay tolerances are exceeded, the OAM server might generate state information comprising a second performance issue error indicating delay. In response to a determination that a frame loss ratio is exceeded in at least one of a transmit direction or a receive direction, the OAM server might generate state information comprising a third performance issue error indicating frame loss. Although the alarms referred to herein are referred to as first, second, third, Yellow, Red, or Blue, the various embodiments are not so limited, and other naming conventions may be used, as appropriate or as desired, to designate one or more of the alarms.

Method 1200, at block 1215, might comprise sending, with the OAM server, the state information to one or more customer equipment, using in-band signaling over a first band between the at least two network devices. In some embodiments, at least one of voice data or non-state information data might be communicated over the first band between the at least two network devices. The in-band signaling of the state information to the one or more customer equipment might comprise signaling of metadata and control information associated with the state information over the first band that is also used to communicate the at least one of voice data or non-state information data.

In some embodiments, the method 1200 might further comprise additionally sending, with the OAM server, the state information to the one or more customer equipment, using out-of-band signaling over a second band between the at least two network devices (block 1220). The second band might be a separate and dedicated band compared with the first band—in other words, the second band might communicate only state information (and not voice data or non-state information data that might be communicated over the first band).

Merely by way of example, in some embodiments, the method might further comprise, at block 1225, performing, using a shaper, at least one of adjusting signal flow or shaping signal flow of at least one of voice data or non-state information data over the first band to ensure that communication of the at least one of voice data or non-state information data over the first band remains within predetermined threshold levels (e.g., the predetermined jitter tolerances, the predetermined delay tolerances, the frame loss ratio, and/or the like). In some cases, the shaper might perform the at least one of adjusting signal flow or shaping signal flow of at least one of voice data or non-state information data over the first band, based at least in part on the state information received from the OAM server. In some instances, the shaper, which might include an Intelligent shaper, might comprise a second OAM server that determines status of the network connection between the at least two network devices and generates second state information indicating the determined status. The shaper might perform the at least one of adjusting signal flow or shaping signal flow of at least one of voice data or non-state information data over the first band, based at least in part on the second state information generated by the second OAM server within the shaper. According to some cases, the shaper might be disposed within at least one of the one or more customer equipment. In some instances, the shaper might be disposed within at least one of one or more user network interface devices, one or more network interface devices, or one or more servers over a network.

As described above, some advantages of the disclosed embodiments include, without limitation, systems and methods for providing in-band signaling from a service provider equipment to customer equipment. The disclosed embodiments also include an intelligent shaper within a customer equipment that may be used to shape the flow of traffic either based on a signaling event from a service provider equipment or, in other embodiments, independently of a service provider providing a signaling event.

Figure 13:
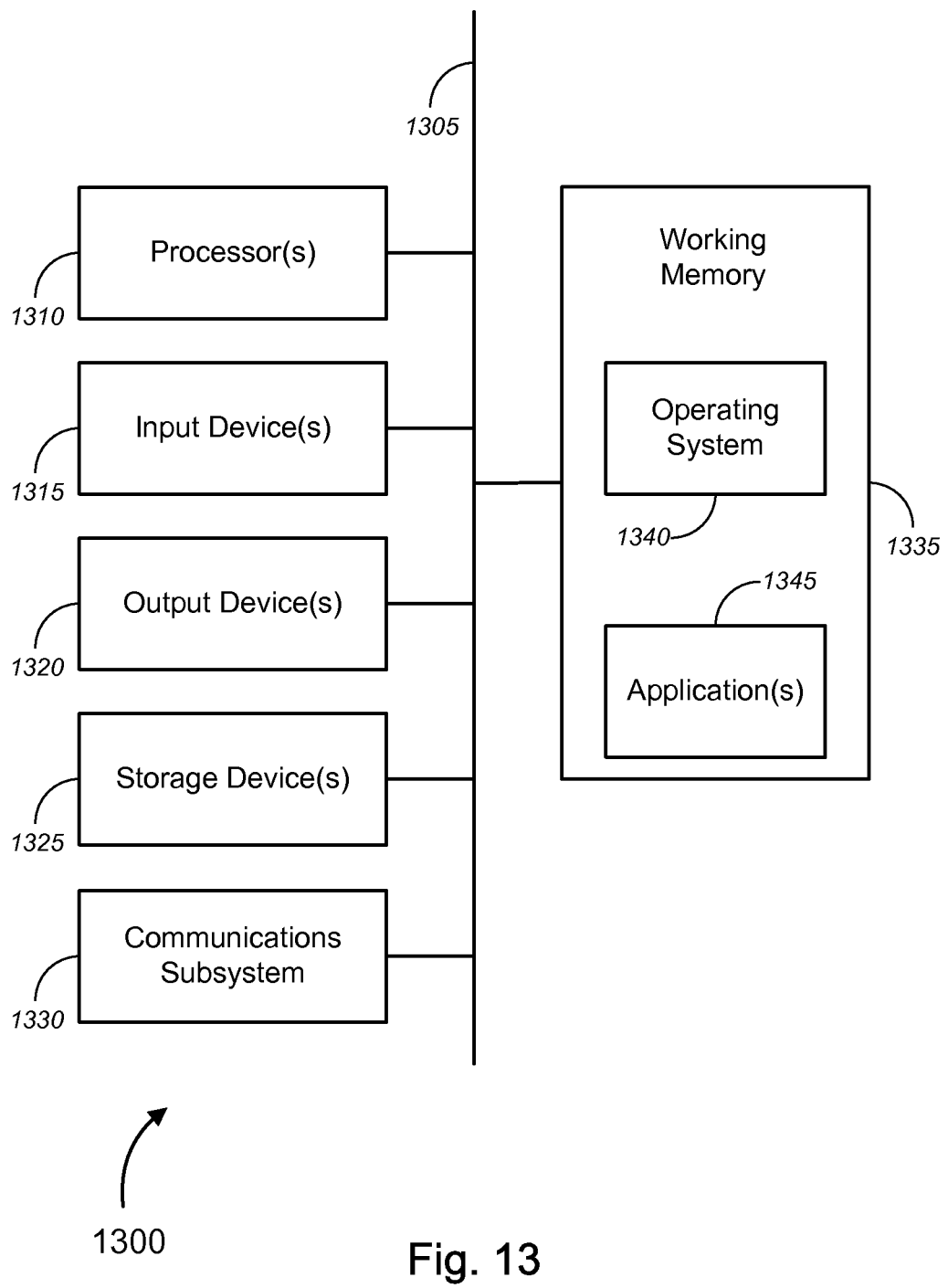
FIG. 13 is a block diagram illustrating an exemplary computer or system hardware architecture, in accordance with various embodiments.

FIG. 13 provides a schematic illustration of one embodiment of a computer system 1300 that can perform the methods provided by various other embodiments, as described herein, and/or can function as a customer equipment, a user device, a UNI, a NID, an ONT, a control server, an OAM server, server computer, and/or the like. It should be noted that FIG. 13 is meant only to provide a generalized illustration of various components, of which one or more (or none) of each may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which can include, without limitation, a mouse, a keyboard, and/or the like; and one or more output devices 1320, which can include, without limitation, a display device, a printer, and/or the like.

The computer system 1300 may further include (and/or be in communication with) one or more storage devices 1325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 1300 might also include a communications subsystem 1330, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1330 may permit data to be exchanged with a network (such as the network described below, to name one example), with other computer systems, and/or with any other devices described herein. In many embodiments, the computer system 1300 will further comprise a working memory 1335, which can include a RAM or ROM device, as described above.

The computer system 1300 also may comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1325 described above. In some cases, the storage medium might be incorporated within a computer system, such as the system 1300. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1300) to perform methods in accordance with various embodiments of the invention. According to a set of embodiments, some or all of the procedures of such methods are performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer readable medium, such as one or more of the storage device(s) 1325. Merely by way of example, execution of the sequences of instructions contained in the working memory 1335 might cause the processor(s) 1310 to perform one or more procedures of the methods described herein.

The terms "machine readable medium" and "computer readable medium," as used herein, refer to any medium that participates in providing data that causes a machine to operate in a specific fashion. In an embodiment implemented using the computer system 1300, various computer readable media might be involved in providing instructions/code to processor(s) 1310 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 1325. Volatile media includes, without limitation, dynamic memory, such as the working memory 1335. Transmission media includes, without limitation, coaxial cables, copper wire and fiber optics, including the wires that comprise the bus 1305, as well as the various components of the communication subsystem 1330 (and/or the media by which the communications subsystem 1330 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300. These signals, which might be in the form of electromagnetic signals, acoustic signals, optical signals, and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1305 retrieves and executes the instructions. The instructions received by the working memory 1335 may optionally be stored on a storage device 1325 either before or after execution by the processor(s) 1310.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    determining, with an operations, administration, and management ("OAM") server, a status of a network connection between at least two network devices;
    generating, with the OAM server, state information indicating the determined status of the network connection between the at least two network devices;
    sending, with the OAM server, the state information to one or more customer equipment, using in-band signaling over a first band between the at least two network devices, wherein the state information comprises one or more first alarms and at least one second alarm, wherein the one or more first alarms indicate, as a status of the network connection, a performance issue error and wherein the at least one second alarm indicates, as a status of the network connection, where a performance issue is occurring, wherein the at least one second alarm indication indicates at least one of a receive path error from the network perspective of the one or more customer equipment, wherein the receive path is an entire path toward at least one network device or a transmit path error from the network perspective of the one or more customer equipment, wherein the transmit path is an entire path away from at least one network device; and performing, using a shaper, at least one of adjusting signal flow or shaping signal flow of at least one of voice data or non-state information data over the first band to ensure that communication of the at least one of voice data or non-state information data over the first band remains within predetermined threshold levels, wherein the shaper is disposed within at least one of the one or more customer equipment, wherein the shaper comprises a second OAM server that is integrated with the shaper and disposed within the one or more customer equipment, wherein the second OAM server determines status of the network connection between the at least two network devices and generates second state information indicating the determined status, and wherein the shaper performs the at least one of adjusting signal flow or shaping signal flow of at least one of voice data or non-state information data over the first band, based at least in part on the second state information generated by the second OAM server integrated within the shaper.

2. The method of claim 1, wherein the performance issue error indicates at least one of jitter, delay, frame loss, peak actual throughput, or average actual throughput.

3. The method of claim 2, wherein, in response to a determination that predetermined jitter tolerances are exceeded, the OAM server generates state information comprising a first performance issue error indicating jitter, wherein, in response to a determination that predetermined delay tolerances are exceeded, the OAM server generates state information comprising a second performance issue error indicating delay, wherein, in response to a determination that a frame loss ratio is exceeded in at least one of a transmit direction or a receive direction, the OAM server generates state information comprising a third performance issue error indicating frame loss.

4. The method of claim 1, wherein each of the at least two network devices comprises one of a customer equipment, a user network interface device, a network interface device, or a server over a network.

5. The method of claim 1, wherein the OAM server is disposed or embodied within at least one of the one or more customer equipment, one or more user network interface devices, one or more network interface devices, or one or more servers over a network.

6. The method of claim 1, wherein at least one of voice data or non-state information data is communicated over the first band between the at least two network devices, wherein the in-band signaling of the state information to the one or more customer equipment comprises signaling of metadata and control information associated with the state information over the first band that is also used to communicate the at least one of voice data or non-state information data.

7. The method of claim 1, further comprising:
additionally sending, with the OAM server, the state information to the one or more customer equipment, using out-of-band signaling over a second band between the at least two network devices, the second band being a separate and dedicated band compared with the first band, wherein the second band communicates only state information.

8. The method of claim 1, wherein the shaper performs the at least one of adjusting signal flow or shaping signal flow of at least one of voice data or non-state information data over the first band, based at least in part on the state information received from the OAM server.

9. A system, comprising:
an operations, administration, and management ("OAM") server, comprising:
at least one processor; and
a non-transitory computer readable medium in communication with the at least one processor, the computer readable medium having stored thereon software comprising a set of instructions that when executed by the at least one processor causes the OAM server to perform one or more functions, the set of instructions comprising:
instructions for determining a status of a network connection between at least two network devices;
instructions for generating state information indicating the determined status of the network connection between the at least two network devices; and
instructions for sending the state information to one or more customer equipment, using in-band signaling over a first band between the at least two network devices, wherein the state information comprises one or more of a first alarms and at least one second alarm, wherein the one or more first alarms indicate, as a status of the network connection, a performance issue error and wherein the at least one second alarm indicates, as a status of the network connection, where a performance issue is occurring, wherein the at least one second alarm indication indicates at least one of a receive path error from the network perspective of the one or more customer equipment, wherein the receive path is an entire path toward at least one network device, or a transmit path error from the network perspective of the one or more customer equipment, wherein the transmit path is an entire path away from at least one network device;
a shaper configured to perform at least one of adjusting signal flow or shaping signal flow of at least one of voice data or non-state information data over the first band, based at least in part on the state information, wherein the shaper is disposed within at least one of the one or more customer equipment, wherein the shaper comprises a second OAM server that is integrated with the shaper and disposed within the one or more customer equipment, wherein the second OAM server determines status of the network connection between the at least two network devices and generates second state information indicating the determined status, and wherein the shaper performs the at least one of adjusting signal flow or shaping signal flow of at least one of voice data or non-state information data over the first band, based at least in part on the second state information generated by the second OAM server integrated within the shaper.

10. The system of claim 9, wherein each of the at least two network devices comprises one of a customer equipment, a user network interface device, a network interface device, or a server over a network.

11. The system of claim 9, wherein the OAM server is disposed or embodied within at least one of the one or more customer equipment, one or more user network interface devices, one or more network interface devices, or one or more servers over a network.

12. An operations, administration, and management ("OAM") server, comprising:
- at least one processor; and
- a non-transitory computer readable medium in communication with the at least one processor, the computer readable medium having stored thereon software comprising a set of instructions that when executed by the at least one processor causes the OAM server to perform one or more functions, the set of instructions comprising:
  - instructions for determining a status of a network connection between at least two network devices;
  - instructions for generating state information indicating the determined status of the network connection between the at least two network devices; and
  - instructions for sending the state information to one or more customer equipment, using in-band signaling over a first band between the at least two network devices, wherein the state information comprises one or more first alarms and at least one second alarm, wherein the one or more first alarms indicate, as a status of the network connection, a performance issue error and wherein the at least one second alarm indicates, as a status of the network connection, where a performance issue is occurring, wherein the at least one second alarm indication indicates at least one of a receive path error from the network perspective of the one or more customer equipment, wherein the receive path is an entire path toward at least one network device or a transmit path error from the network perspective of the one or more customer equipment, wherein the transmit path is an entire path away from at least one network device;
- wherein a shaper is used to perform at least one of adjusting signal flow or shaping signal flow of at least one of voice data or non-state information data over the first band to ensure that communication of the at least one of voice data or non-state information data over the first band remains within predetermined threshold levels, wherein the shaper is disposed within at least one of the one or more customer equipment, wherein the shaper comprises a second OAM server that is integrated with the shaper and disposed within the one or more customer equipment, wherein the second OAM server determines status of the network connection between the at least two network devices and generates second state information indicating the determined status, and wherein the shaper performs the at least one of adjusting signal flow or shaping signal flow of at least one of voice data or non-state information data over the first band, based at least in part on the second state information generated by the second OAM server integrated within the shaper.

13. The OAM server of claim 12, wherein the OAM server is disposed or embodied within at least one of the one or more customer equipment, one or more user network interface devices, one or more network interface devices, or one or more servers over a network.

14. The method of claim 1, wherein performing, using a shaper, at least one of adjusting signal flow or shaping signal flow of at least one of voice data or non-state information data over the first band to ensure that communication of the at least one of voice data or non-state information data over the first band remains within predetermined threshold levels comprises adjusting signal flow or shaping signal flow of at least one of voice data or non-state information data of the one or more customer equipment containing the shaper.

15. The method of claim 1, wherein the shaper performs the at least one of adjusting signal flow or shaping signal flow of at least one of voice data or non-state information data over the first band, based at least in part on the first state information generated by the first OAM server.

16. The method of claim 1, further comprising:
- duplicating, with the OAM server, the state information indicating the determined status of the network connection between the at least two network devices; and
- additionally sending, with the OAM server, duplicated state information to the one or more customer equipment, using out-of-band signaling over a second band between the at least two network devices, the second band being a separate and dedicated band compared with the first band, wherein the second band communicates only state information.

* * * * *